US009447480B2

(12) United States Patent
Vaughan et al.

(10) Patent No.: US 9,447,480 B2
(45) Date of Patent: Sep. 20, 2016

(54) METHOD OF ORE PROCESSING

(75) Inventors: James Vaughan, St. Lucia (AU);
William Hawker, St. Lucia (AU)

(73) Assignee: The University of Queensland, St. Lucia (AU)

( * ) Notice: Subject to any disclaimer, the term of this patent is extended or adjusted under 35 U.S.C. 154(b) by 76 days.

(21) Appl. No.: 13/981,823

(22) PCT Filed: Jan. 25, 2012

(86) PCT No.: PCT/AU2012/000058
§ 371 (c)(1),
(2), (4) Date: Sep. 20, 2013

(87) PCT Pub. No.: WO2012/100293
PCT Pub. Date: Aug. 2, 2012

(65) Prior Publication Data
US 2014/0023572 A1    Jan. 23, 2014

(30) Foreign Application Priority Data

Jan. 25, 2011  (AU) ................. 2011900232

(51) Int. Cl.
C22B 15/00      (2006.01)
C22B 3/06       (2006.01)
C22B 3/00       (2006.01)
C22B 19/02      (2006.01)

(52) U.S. Cl.
CPC ............ *C22B 15/0071* (2013.01); *C22B 3/06* (2013.01); *C22B 19/02* (2013.01); *C22B 23/043* (2013.01); *C22B 23/0415* (2013.01); *C22B 23/0476* (2013.01); *C22B 23/0484* (2013.01); *Y02P 10/234* (2015.11)

(58) Field of Classification Search
None
See application file for complete search history.

(56) References Cited

U.S. PATENT DOCUMENTS

| 4,435,368 | A  |   | 3/1984  | Demarthe et al. |
| 6,409,979 | B1 |   | 6/2002  | White |
| 6,428,604 | B1 | * | 8/2002  | Kerfoot ................. C22B 3/06 205/370 |
| 8,580,213 | B2 |   | 11/2013 | Kobayashi et al. |

FOREIGN PATENT DOCUMENTS

| AU | 2008255245    | 7/2009 |
| AU | 2009200219    | 8/2009 |
| CA | 1096636       | 3/1981 |
| CA | 1195511       | 10/1985 |
| JP | 52-096903     | 8/1977 |
| JP | 52096903   A * | 8/1977 |

(Continued)

OTHER PUBLICATIONS

International Preliminary Report on Patentability issued in International Application No. PCT/AU2012/000058 dated Jul. 30, 2013.
International Search Report for PCT/AU2012/000058, mailed Mar. 5, 2012.

(Continued)

*Primary Examiner* — Melissa Swain
(74) *Attorney, Agent, or Firm* — Nixon & Vanderhye PC

(57) ABSTRACT

A method of selectively leaching a metal such as nickel from an ore or ore processing intermediate comprising the metal and cobalt. The ore or ore processing intermediate is contacted with an acidic leach solution comprising an amount of an oxidising agent sufficient to oxidise a major portion of the cobalt to thereby cause it to be stabilised in the solid phase while a major portion of the metal is dissolved for subsequent recovery.

20 Claims, 4 Drawing Sheets

(56) References Cited

FOREIGN PATENT DOCUMENTS

| JP | 2005-104809 | | | 4/2005 |
|---|---|---|---|---|
| JP | 2005104809 | A | * | 4/2005 |
| JP | 2010-180439 | | | 8/2010 |
| JP | 2010180439 | A | * | 8/2010 |

OTHER PUBLICATIONS

Written Opinion of the International Searching Authority for PCT/AU2012/000058, mailed Mar. 5, 2012.
James Nolan, "Preferential Precipitation of Cobalt by Oxidation," The University of Queensland Australia—Bachelor of Engineering Thesis, Oct. 30, 2008, 106 pages.

* cited by examiner

METHOD OF ORE PROCESSING

This application is the U.S. national phase of International Application No. PCT/AU2012/000058, filed 25 Jan. 2012, which designated the U.S. and claims priority to Australian Application No. 2011900232, filed 25 Jan. 2011, the entire contents of each of which are hereby incorporated by reference.

FIELD OF THE INVENTION

The present invention relates to a method of recovering a metal from a source material. Particularly, the present invention relates to a method of selectively recovering a metal directly from a solid ore or ore processing intermediate containing said metal and cobalt.

BACKGROUND OF THE INVENTION

Nickel is a valuable commodity and is predominantly sourced from either sulphide or laterite mineral deposits. Large high grade sulphide deposits are increasingly rare and so the processing of laterite ores is predicted to become the dominant source of the metal.

A common method of treating laterite ores is to leach the solids in acid. Acid leaching is generally followed by impurity precipitation, commonly achieved by adding limestone. Following impurity precipitation, nickel and cobalt are usually recovered from the aqueous solution together by either mixed sulphide precipitation, or mixed hydroxide precipitation. Mixed hydroxide precipitation is a relatively recent large scale industrial technology achieved by adding a basic chemical such as magnesia, lime, limestone or sodium hydroxide to the leach solution. The mixed hydroxide precipitate (MHP) consists of mostly nickel hydroxide but also contains valuable cobalt hydroxides and various other impurities. The MHP represents a more value concentrated product in that the approximately 1% nickel and 0.1% cobalt present in the original laterite ore are upgraded substantially in terms of their relative amounts in the MHP. Since the MHP has such a high valuable metal content, the feasibility of operating a centralized nickel and cobalt refinery increases. This is because the transportation costs for the upgraded intermediate product would be a fraction of that for the as-mined ore.

The MHP may be further processed in a number of ways. For example, it may be added to the melt of an iron smelter in order to alloy the contained nickel with iron. This process is not suitable for MHP with significant cobalt content as the valuable cobalt is not recovered.

Another major processing route for refining MHP is by leaching the material in an ammonia/ammonium carbonate solution. The nickel and cobalt dissolve in the ammonia solution to form ammonia complexes. Nickel is then extracted into an organic solvent to separate the nickel from the cobalt. The extracted nickel is then stripped from the organic phase and precipitated using steam. This forms a basic nickel carbonate which is then calcined to form nickel oxide which can be sold as a product in its own right or reduced using hydrogen gas to form nickel metal compacts. The cobalt is subsequently precipitated from the aqueous phase as a cobalt sulphide using hydrogen sulphide gas. This cobalt sulphide is then re-leached in acid, passed through multiple stages of solvent extraction and ion exchange to remove impurities, then switched to the aqueous ammonia system and concentrated before being precipitated as a pure cobalt oxy-hydroxide by steam stripping.

Such prior art approaches are generally either relatively energy intensive, do not return optimal nickel and/or cobalt recoveries, require an excessive number of processing stages or are sensitive to the presence of other impurities such as aluminium, iron and chromium.

There is a need for an improved method of recovering nickel from nickel containing ores. It would be desirable to provide for a straightforward separation of nickel from cobalt in MHP and enable an efficient recovery of both commodities.

Further, although the discussion above relates to the recovery of nickel and its separation from at least cobalt in a nickel and cobalt containing ore it will be appreciated that there is a need for the effective separation of a range of metals, in a similar manner, from the cobalt they are naturally associated with.

OBJECT OF THE INVENTION

The object of the invention is to overcome or at least alleviate one or more of the above problems or to at least provide for a useful commercial choice.

SUMMARY OF THE INVENTION

In one broad form the invention resides in a method of separating a non-cobalt metal from cobalt in a solid ore or ore processing intermediate comprising the non-cobalt metal and cobalt by contacting the solid ore or ore processing intermediate with an acidic solution comprising an oxidant to thereby selectively dissolve the non-cobalt metal and filtering off the solid cobalt to thereby separate the non-cobalt metal from the cobalt.

In a first aspect, although it need not be the only or indeed the broadest form, the invention resides in a method of selectively leaching a metal selected from the group consisting of nickel, copper and zinc from a solid ore or ore processing intermediate comprising the metal and cobalt including the step of contacting the solid ore or ore processing intermediate with an acidic leach solution comprising an amount of an oxidising agent sufficient to oxidise a major portion of the cobalt to thereby cause it to be stabilised in the solid phase while a major portion of the metal is dissolved.

Preferably, the metal is nickel.

Suitably, the solid ore or ore processing intermediate comprising the metal and cobalt is a mixed nickel-cobalt hydroxide precipitate or a solid copper-cobalt or zinc-cobalt processing concentrate.

A 'major portion' may refer to greater than 50%, preferably greater than 60%, more preferably greater than 70%, even more preferably greater than 80% in relation, independently, to both stabilisation of the cobalt and/or manganese in the solid phase and to dissolution of the nickel.

A 'substantial portion' may refer to greater than 90%, preferably greater than 95% in relation, independently, to both stabilisation of the cobalt and/or manganese in the solid phase and to dissolution of the nickel.

Preferably, contacting the ore or ore processing intermediate with the acidic leach solution comprising an amount of the oxidising agent results in a substantial portion of the cobalt being oxidised to thereby cause it to be stabilised in the solid phase while a substantial portion of the metal is dissolved.

Preferably, the oxidising agent has sufficient oxidising potential to oxidise cobalt(II) to cobalt(III).

Suitably, the oxidising agent is selected from the group consisting of persulphates, peroxides, permanganates, perchlorates, ozone, oxides and chlorine.

Preferably, the oxidising agent is a persulphate or a permanganate.

In one embodiment, the oxidising agent is sodium or potassium persulphate, sodium or potassium permanganate, ozone, magnesium or hydrogen peroxide, chlorine gas or sodium or potassium perchlorate. Sodium or potassium persulphate or sodium or potassium permanganate are particularly preferred.

In one preferred embodiment the oxidising agent is not a gaseous oxidising agent.

The ore or ore processing intermediate may further contain manganese and treatment with the acidic leach solution comprising an oxidising agent may stabilize at least a portion of the manganese in the solid phase.

In a further embodiment, the invention resides in a method of recovering nickel and cobalt from a mixed nickel-cobalt hydroxide precipitate including the steps of:

(a) contacting the mixed nickel-cobalt hydroxide precipitate with an acidic leach solution comprising an oxidising agent, the oxidising agent present in an amount sufficient to stabilise a major portion of the cobalt in the solid phase while a major portion of the nickel is dissolved;

(b) separating the solid cobalt concentrate from the leach solution containing dissolved nickel to thereby recover the cobalt; and (c) recovering the nickel from the leach solution.

The nickel may be recovered as solid metal from the leach solution by electrowinning or hydrogen reduction. Alternatively, the nickel may be recovered as a salt, for example, as solid nickel sulphate hydrate by crystallisation.

The mixed nickel-cobalt hydroxide precipitate may further comprise manganese and addition of the amount of oxidising agent also causes a major portion of the manganese to be stabilised in the solid phase while a major portion of the nickel is dissolved.

The method may further include the step of separating the solid manganese from the leach solution.

The method may further include the step of separating the cobalt and manganese solids by selective dissolution of either cobalt or manganese in either acidic solution or alkaline ammonia containing solution.

Throughout this specification, unless the context requires otherwise, the words "comprise", "comprises" and "comprising" will be understood to imply the inclusion of a stated integer or group of integers but not the exclusion of any other integer or group of integers.

BRIEF DESCRIPTION OF THE FIGURES

In order that the invention may be readily understood and put into practical effect, preferred embodiments will now be described by way of example with reference to the accompanying figures wherein.

DETAILED DESCRIPTION OF THE INVENTION

Figure 1:
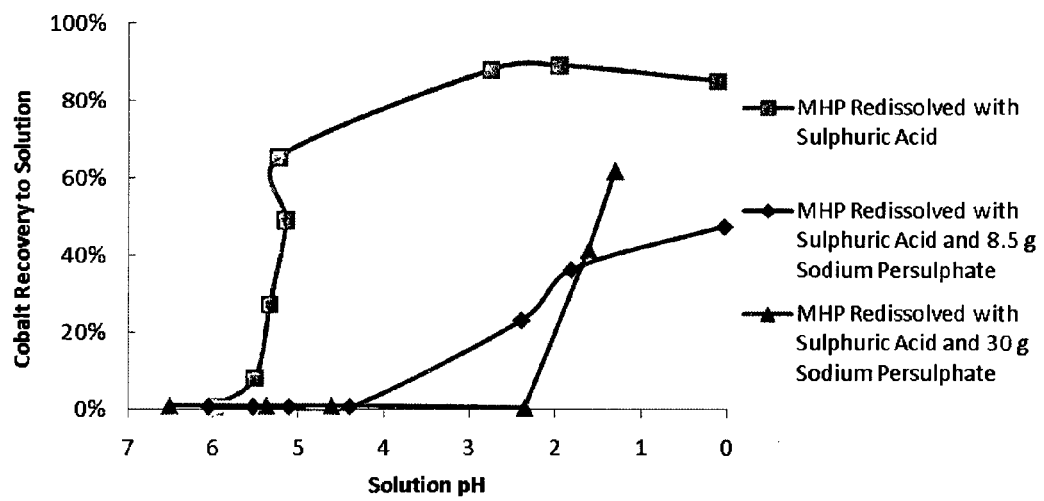
FIG. 1 is a graphical representation of the recovery of cobalt to solution from a mixed nickel-cobalt hydroxide precipitate over a range of pH values for three different test conditions.

The present invention is predicated, at least in part, on the development of a method of preferentially directly leaching nickel, from a solid ore or ore processing intermediate comprising nickel and cobalt, into an acidic solution using a suitable oxidant to maintain the cobalt in the solid state. Although the discussion herein relates to the application of this method to a mixed nickel-cobalt hydroxide precipitate, it will be appreciated that it may be useful in the separation of nickel from cobalt within any suitable solid source material.

The present inventors have found that the selective dissolution of nickel from a mixed nickel-cobalt hydroxide precipitate is a surprisingly fast and effective method to separate out the nickel and cobalt when compared to certain prior art approaches which attempt to selectively precipitate cobalt from a cobalt and nickel solution. Selection of appropriate conditions including the choice of a strong oxidant, pH and relative amounts of acid and oxidant to source material can provide a surprisingly efficient separation.

Although the invention has been demonstrated herein with particular reference to the separation of nickel and cobalt it is believed that the present method is equally applicable to the separation of copper and/or zinc from cobalt. The separation of both copper and zinc from cobalt is based upon the same principles described herein in relation to nickel, with suitable adjustments.

The terms "oxidising agent" or "oxidant", as used herein, refer to a reagent which is capable of causing a substrate to increase its oxidation state, e.g. to lose an electron, the reagent itself being reduced (gaining an electron) in the process.

The term "mixed hydroxide precipitate" or "MHP", as used herein, refers to a solid mixed nickel-cobalt hydroxide precipitate being a known intermediate product in the commercial processing of nickel containing ores which comprises a variety of nickel, cobalt and, possibly manganese, compounds including oxides and hydroxides. It will be appreciated that references herein to "nickel", "cobalt" or "manganese" in relation to their separation may be taken as references to one or more of these compounds, including oxides and hydroxides of the metals. The nickel and cobalt are at a higher concentration within the MHP than in the original mined ores representing the source material.

The terms "stabilise", "stabilising" or "stabilised" are used herein in relation to preferentially maintaining cobalt and/or manganese as a solid, following treatment of the ore or ore processing intermediate with an acidic leach solution comprising an oxidant, while nickel or copper or zinc are dissolved. Thus the nickel or copper or zinc are dissolved in preference to the cobalt.

It has been found that a nickel and cobalt containing MHP can be directly treated with an acidic solution comprising a suitable oxidant, at an appropriate pH, to cause the cobalt to be stabilised in the solid phase while the nickel dissolves in the acidic solution. The cobalt containing solid can then be collected and the cobalt recovered by various suitable means. As a highly concentrated nickel solution can be obtained by this method, the nickel can be subsequently recovered from the solution by means including electrowinning to nickel metal, hydrogen reduction to nickel metal or crystallisation to nickel sulphate hydrate.

To demonstrate this improved method of separation and its advantages over the rather complex and inefficient methods of the prior art a number of experiments were carried out on Ravensthorpe MHP (Ravensthorpe Nickel Mine, Ravensthorpe, Western Australia) which was leached at 80° C. with a sulphuric acid solution. The nature of each test is set out in table 1, below.

TABLE 1

Leaching experiments carried out on MHP at 80° C.

| Test | Conditions | Comments |
|---|---|---|
| 1 | 175 g MHP in 1 L-solution. 7 additions of 7.5 mL 98% sulphuric acid over 3.5 hours. | Baseline - No Strong Oxidant |
| 2 | 175 g MHP in 1 L-solution. 8.65 g sodium persulphate as oxidant. 7 additions of 7.5 mL 98% sulphuric acid every 30 minutes over 3.5 hours | Low Dose of Strong Oxidant |
| 3 | 175 g MHP in 1 L-solution. 10 g sodium persulphate as oxidant initially with 4 further 5 g additions every 30 minutes. 15 additions of 4 mL 98% sulphuric acid every 10 minutes over 2.5 hours. | High Dose of Strong Oxidant |
| 4 | 43.75 g MHP in 250 mL-solution. 3.38 g sodium persulphate as oxidant. Solution held at pH 3 by addition of sulphuric acid for 1 hour. | Constant pH High Dose of Strong Oxidant |
| 5 | 43.75 g MHP in 250 mL-solution. 3.38 g sodium persulphate as oxidant. Solution held at pH 3 by addition of sulphuric acid for 2 hours. | Constant pH High Dose of Strong Oxidant |

The moisture and metal content of the MHP (dry basis) is shown in table 2.

TABLE 2

Ravensthorpe MHP Composition (dried)

| Property | |
|---|---|
| Moisture % | 48% |
| Nickel | 45% |
| Cobalt | 1.6% |
| Manganese | 2.7% |

Figure 2:
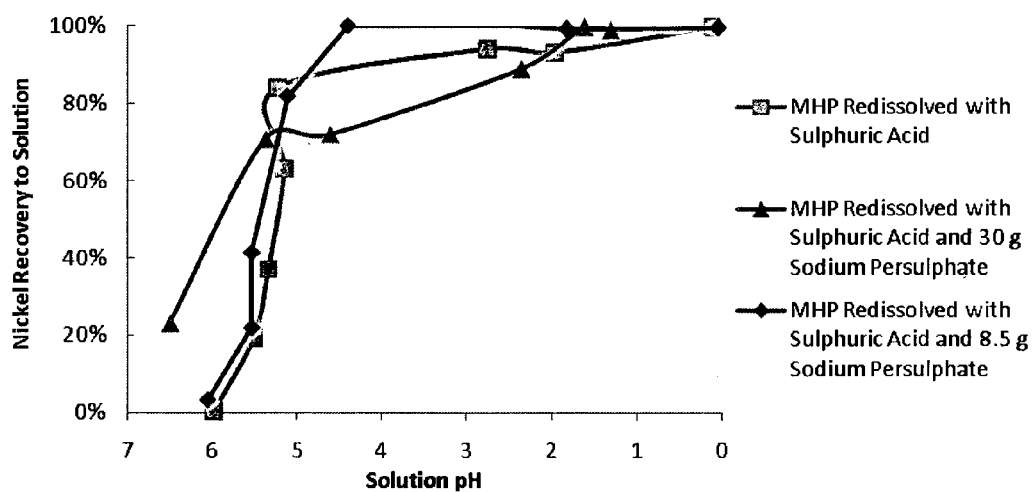
FIG. 2 is a graphical representation of the recovery of nickel to solution from a mixed nickel-cobalt hydroxide precipitate over a range of pH values for three different test conditions.
Figure 3:
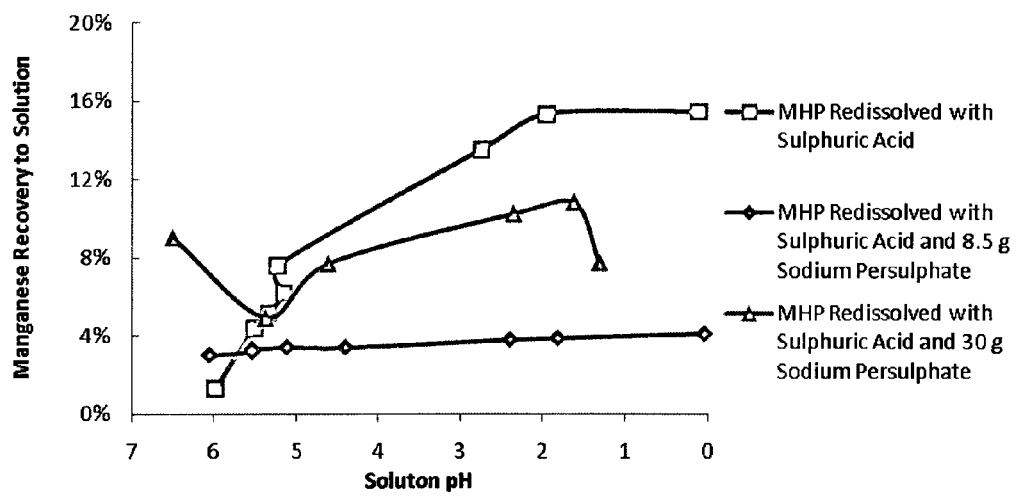
FIG. 3 is a graphical representation of the recovery of manganese to solution from a mixed nickel-cobalt hydroxide precipitate over a range of pH values for three different test conditions.

The effect of oxidant concentration on the dissolution of cobalt, nickel and manganese over a range of pH values, representing results from the above experiments, are shown in FIGS. 1, 2 and 3, respectively.

FIG. 1 is a graphical representation of the recovery of cobalt from the MHP into solution over a range of pH values achieved for tests 1 to 3. Test 1 showed that without any oxidant approximately 70% of the cobalt is in solution below pH 5 and more than 85% is in solution below pH 3. Tests 2 and 3 showed that the addition of sodium persulphate, as a strong oxidant, is extremely effective in stabilising the cobalt in the solid phase. Test 3 resulted in more than 99% of the cobalt being stabilised in the solid phase down to at least pH 2.5 while the test 2 results show that more than 99% of the cobalt was stabilised in the solid phase down to at least pH 4.5. The next data point for test 2 was at pH 2.5 and so it is likely that this high level of suspension of cobalt in the solid phase is maintained closer to that pH point than is indicated on FIG. 1.

FIG. 2 is a graphical representation of the recovery of nickel to solution over a range of pH values achieved for tests 1 to 3. Tests 1 and 2 resulted in more than 85% of the nickel being maintained in solution at about pH 5. However, in test 2 close to 100% of the nickel was in solution below about pH 4.5 representing a highly successful leaching step. Test 3 showed about 70% of the nickel in solution at about pH 4 thereby indicating that the rate of addition and/or total amount of the oxidant added is a key factor to be controlled. The rate of addition of the oxidising agent may be controlled, as in tests 1-3, by adding it to the leach solution portion wise over a set period of time. The time period may be between 1 to 10 hours, preferably 1 to 5 hours.

The mixed hydroxide precipitate will contain a significant amount of manganese and addition of the amount of oxidising agent which causes stabilisation of the cobalt in the solid phase may also have the same effect on the manganese. Although the monetary value of manganese is significantly less than nickel and cobalt as a commodity, it is preferable to address its separation from the MHP as it is an impurity contained therein and has many stable oxidation states. It is one advantage of the present invention that the separation of manganese from the nickel and/or cobalt within the MHP may be addressed.

The present method may further include the step of separating solid manganese from the acidic leach solution in which the nickel is dissolved. Maintaining the manganese in the solid phase during nickel leaching can be accomplished by suitable pH adjustment in combination with appropriate oxidizing conditions, as is described in relation to FIG. 3.

The method may also further include the step of separating manganese from cobalt by selectively dissolving the cobalt under mildly acidic and slightly reducing conditions. A further method to selectively dissolve the cobalt leaving the manganese in the solid phase is to contact the mixed solid with alkaline ammonia containing solution.

FIG. 3 is a graphical representation of the recovery of manganese to solution over a range of pH values achieved for tests 1 to 3. Test 1 showed that without the presence of a strong oxidant more than 8% of the manganese is in solution below pH 5 and more than 12% is in solution below pH 3. Tests 2 and 3 showed that the addition of sodium persulphate as an oxidant is very effective at stabilising further amounts of manganese in the solid phase. The results show between about 4 to 11% of the manganese is in solution from test 3 between the pH range 6 to 0 and only about 3 to 4% for test 2 over the same pH range. The solution in test 3 was observed to turn a bright purple colour which is known to be an indication of some permanganate formation in solution. Tests 1 and 2 did not demonstrate any purple colour in solution and so the higher amount of oxidant used in test 3 appears to have had a significant effect on increasing the manganese oxidation state and therefore the manganese balance to form greater amounts of permanganate ions. This, at least partially, explains the higher recovery of manganese to solution for test 3 compared to test 2.

FIG. 3 demonstrates that, overall, significant amounts of manganese can be stabilised in the solid phase while substantially all of the nickel is still in solution, thereby allowing an improved separation.

Figure 4:
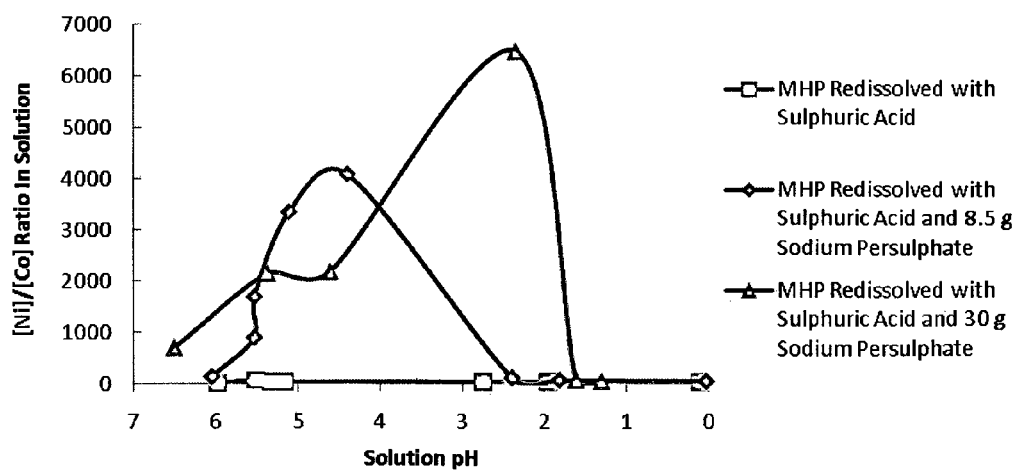
FIG. 4 is a graphical representation of the nickel to cobalt ratio, measured over a range of pH values, in a solution after treatment with three different test conditions.

FIG. 4 is a graphical representation of the nickel to cobalt ratio, measured over a range of pH values, in an MHP leach solution after treatment with the three different test conditions of tests 1 to 3. The optimal separation of nickel and cobalt in the solution occurs somewhere between pH 5 and 2, with better separation at lower pH values for test 3. A nickel to cobalt ratio of 6000, as is seen for test 3 at approximately pH 2.5, indicates excellent separation as the initial ratio of nickel to cobalt in the MHP was about 25. Test 2 also provided very significant and commercially valuable separation of the nickel and cobalt with a value of over 4000 at between pH 4 and 5.

It should be clear that the selectivity of the stabilisation of cobalt and/or manganese in the solid phase while achieving dissolution of the nickel is dependent on both the pH of the solution and the nature/strength and/or amount of the oxidant. Thus the method may further include the step of adjusting the pH of the acidic leach solution to be between about 1 to about 6, preferably between about 2 to about 5. Between pH 1 and 6 includes a pH of 1, 1.5, 2, 2.5, 3, 3.5, 4, 4.5, 5, 5.5 or 6.

In one general embodiment, the pH of the acidic solution is adjusted to be between 1.5 and 5. The pH of the acidic solution may be adjusted to be between 2 and 4, between 2 and 3, between 3 and 5 or between 4 and 5.

Tests 4 and 5 were carried out at a constant pH of 3 for different lengths of time being 1 and 2 hours, respectively. The results of these tests are shown in table 3 and they demonstrate that nickel and cobalt can be effectively separated with substantially all of the cobalt being stabilised in the solid phase while dissolving substantially all of the nickel. The results also indicate that with increased time (in going from test 4 to test 5) the separation is improved and more manganese is also stabilised in the solid phase.

The tests show that an excellent recovery of nickel can be obtained within a 1 to 4 hour time frame. It will be appreciated that the exact time required will depend on a number of factors including the pH, amount of oxidising agent and rate of addition thereof. In one embodiment, the majority of the nickel will have been leached into the leach solution after between about 1 to 10 hours, preferably after between about 1 to about 5 hours, more preferably after between about 1 to about 3 hours.

TABLE 3

Results from tests 4 and 5

|  | Test 4 - 1 hr | Test 5 - 2 hrs |
|---|---|---|
| Nickel Recovery to Solution | 96.75% | 96.99% |
| Cobalt Recovery to Solution | 0.61% | 0.50% |
| Manganese Recovery to Solution | 7.23% | 3.45% |
| Ni/Co Ratio in Solution | 3151 | 3855 |
| Nickel Recovery to Residue | 3.25% | 3.01% |
| Cobalt Recovery to Residue | 99.39% | 99.50% |
| Manganese Recovery to Residue | 92.77% | 96.55% |
| Co/Ni Ratio in Residue | 1.54 | 1.66 |

The results show that greater than 96% of the nickel present in MHP can be preferentially dissolved and maintained in solution under mildly acidic and strongly oxidizing conditions in a single stage batch experiment. The residual solid contained greater than 90% of the manganese and greater than 99% of the cobalt. The solid residue containing the cobalt and manganese can easily be filtered off and the nickel solution made available for electrowinning or other suitable process to recover the nickel as a final product.

The cobalt-manganese solid concentrate may require further processing but is a valuable intermediate product in its own right assaying at approximately 15 wt. % cobalt. If further separation is desired then dissolving of the cobalt and manganese in an acidic solution below about pH 2.5 and selective reduction to precipitate the manganese may provide a simple way to separate the cobalt from the manganese.

This ability to separate nickel from cobalt in MHP through a single, selective leaching stage at very high efficiency allows the processing of MHP to be greatly simplified over the current industrial methods. As described, the leaching stage may be carried out using sulphuric acid, or any suitably strong acid which can achieve adequate dissolution of the nickel, and any suitably strong oxidant. Further examples of acids which may be suitable include nitric acid, hydrochloric acid and other strong mineral or other acids as would be known to a person of skill in the art to be useful for the dissolution of metal compounds from ores or ore processing intermediates.

Useful oxidising agents may be selected from the group consisting of persulphates, peroxides, permanganates, perchlorates, ozone, oxides and chlorine.

In one embodiment, the oxidising agent may be sodium or potassium persulphate, sodium or potassium permanganate, ozone, magnesium or hydrogen peroxide, chlorine gas or sodium or potassium perchlorate.

Preferably, the oxidising agent is a persulphate or a permanganate. More preferably, the oxidising agent is sodium or potassium persulphate or sodium or potassium permanganate.

A suitable oxidising agent will have the potential to oxidise cobalt compounds within MHP, when exposed to an acidic solution, such that substantial amounts thereof are stabilised in the solid phase while a substantial portion of the corresponding nickel compounds are dissolved. Preferably, the oxidising agent has sufficient oxidising potential to oxidise cobalt(II) to cobalt(III). This is easily ascertained by a person of skill in the art by the application of a simple test. Briefly, if cobalt is in the divalent state then it will readily dissolve in an aqueous solution at pH 4. If, however, cobalt is in the trivalent state it will not readily dissolve in aqueous solution at pH 4. This simple practical test can be employed by a skilled addressee to easily ascertain the likely effectiveness of any oxidising agent proposed for use in the present process.

Although certain gaseous oxidising agents may be useful, to some extent, in the present method it will be appreciated that at least portions thereof will likely escape from the system and thus the separation of the nickel and cobalt will be sub-optimal. Thus, in one preferred embodiment, the oxidising agent to be added to the acidic leach solution is non-gaseous i.e. a solid or a liquid. Sodium or potassium persulphate or sodium or potassium permanganate are particularly preferred as they do not readily form a gas.

The oxidative potential required of the oxidant to ensure oxidation, and hence stabilisation in the solid phase, of the cobalt and/or manganese species in the MHP will vary with pH. In one embodiment, the oxidative potential of the oxidant will be between 0.5 V versus Standard Hydrogen Electrode (SHE) to about 3.0 V at a pH of from about 0 to about 6. Suitably, at a pH value of between about 6 to about 4 the oxidative potential of the oxidant will be between about 0.5 V to about 1.0 V. Typically, at a pH value of between about 4 to about 1 the oxidative potential of the oxidant is between about 1.0 V to about 3.0 V, preferably between about 1.0 V to about 2.0 V.

A person of skill in the art would be aware of a number of ways in which the oxidative potential of any particular oxidising agent could be ascertained at a particular pH. Standard reference texts may provide tables of commonly used oxidising agents along with their associated potential at one or more selected pH levels. Alternatively, an indication of oxidising potential may be gleaned by employing the oxidising agent in a simple experiment which would be know to a chemist in the field whereby the potential difference between platinum metal and a suitable reference electrode are subsequently measured.

As mentioned, the nickel solution produced by the selective leach may be used to recover the final nickel product by known industrial techniques such as nickel electrowinning or hydrogen reduction. To further demonstrate the potential use of the present method in obtaining nickel metal, a series of experiments were carried out applying the general method already discussed to generate a nickel solution with a nickel concentration sufficiently high for use in a subsequent electrowinning process. A key difference between the following tests compared with those described above is that the solution into which the nickel from the MHP is leached already contains aqueous nickel sulphate and acid to thereby simulate the anolyte produced in the nickel electrowinning process. The tests thus demonstrate the simplicity of the present method in obtaining a nickel solution in a way that is compatible with the nickel electrowinning process where a nickel metal product can be directly obtained.

An MHP sample for use in these tests was assayed to ascertain its composition both before and after drying. The results of the assay are shown in table 4 (shown in two parts).

TABLE 4

Composition of MHP (dry) for tests 6-11
(oxidation states assumed)

| wt. % | $Ni^{2+}$ | $Co^{2+}$ | $Mn^{2+}$ | $Mg^{2+}$ | $Ca^{2+}$ | $Fe^{3+}$ |
|---|---|---|---|---|---|---|
| Dry | 44.5 | 2.4 | 0.78 | 0.77 | 0.4 | 0.2 |
| Moist | 28.0 | 1.5 | 0.49 | 0.49 | 0.25 | 0.13 |

| wt. % | $Al^{3+}$ | $Zn^{2+}$ | $Cu^{2+}$ |
|---|---|---|---|
| Dry | 0.08 | 0.04 | 0.02 |
| Moist | 0.05 | 0.03 | 0.01 |

The tests were carried out in an agitated batch reactor. Firstly, a synthetic nickel anolyte solution containing 50 g-Ni/L-anolyte as $NiSO_4$(aq), 50 g-$H_2SO_4$/L-anolyte was heated to a temperature of 60-65° C. Sodium sulphate was included in the solution to simulate a nickel electrolyte as it is typically added to improve the solution conductivity. 100 g-$Na_2SO_4$/L-anolyte was added in tests 6, 7 and 8 and 167 g-$Na_2SO_4$/L-anolyte added in tests 9, 10 and 11. The tests were run for either 180 or 240 minutes at which time the solids were isolated from the solution by vacuum filtration and washed with two lots of 300 mL deionized water. The solids are then dried to constant mass at 60° C. Samples of the residual solids were then assayed in order to verify the mass balance.

The percentage stoichiometric addition of MHP used in the tests was calculated based on 100% stoichiometric MHP addition being equivalent to the amount of acid required to dissolve all of the nickel compounds content based on assumed chemical reactions. Based on the quantities of MHP and acid used in the tests the metal deportment was measured at leaching conditions over a pH range of 5.7 to 4.5.

The particular experimental conditions and measurements taken in this set of tests are summarized in table 5. Tests 6, 7 and 8 were run for 180 minutes and tests 9, 10 and 11 were extended to 240 minute duration. The main variable was the amount of MHP added to the experiment expressed as the % of the stoichiometric requirement for all the nickel hydroxide to react with the acid available as discussed above.

In one embodiment, the ore or ore processing intermediate, such as the MHP, is present in a stoichiometric % amount of between 100% to about 40% compared to the amount of acid, preferably about 90% to about 50%, more preferably about 85% to about 60%.

The oxidising agent is present in the leach solution in either 125% (tests 7 to 11) or 150% (test 6) stoichiometric equivalents based on the calculated number of moles of cobalt and manganese present in the ore or ore processing intermediate. The effective separation of cobalt and manganese at these stoichiometric levels (near 100%) show that the sodium persulphate utilisation is high.

In one embodiment, between 70% to 500% stoichiometric equivalents of oxidising agent to combined moles of cobalt and manganese may be added, preferably between 80% to 400%, more preferably between 80% to 200% or 100% to 150%, even more preferably about 125%.

It will be appreciated that while the results discussed herein relate to batch experiments, practically, the method described lends itself well to a multistage counter current arrangement to improve the process outcomes. Within such a multistage arrangement the particular process conditions in each step will vary and, indeed, can be optimised with a specific purpose in mind. Using this approach the conditions for nickel dissolution from the mixed nickel-cobalt hydroxide precipitate may be optimised while encouraging the maximum levels of impurities and cobalt to stabilise in the solid phase.

As an example, in the nickel leaching stage the stoichiometric equivalents of MHP added may be kept relatively low and the pH relatively high whereas it may be beneficial to have the pH considerably lower at another stage of the process where the objective is to achieve an upgraded cobalt concentrate with minimal nickel content.

TABLE 5

Leaching conditions for tests 6-11

| Test Number | 6 | 7 | 8 | 9 | 10 | 11 |
|---|---|---|---|---|---|---|
| Leaching Time (min) | 180 | 180 | 180 | 240 | 240 | 240 |
| Leaching Temp ° C. | 65 | 65 | 65 | 65 | 65 | 65 |
| Anolyte Density g/mL | 1.21 | 1.21 | 1.21 | 1.28 | 1.28 | 1.27 |
| Anolyte Mass g | 725.76 | 725.76 | 725.76 | 766.56 | 766.56 | 760.44 |
| Anolyte Volume L | 0.60 | 0.60 | 0.60 | 0.60 | 0.60 | 0.60 |

TABLE 5-continued

Leaching conditions for tests 6-11

| Test Number | 6 | 7 | 8 | 9 | 10 | 11 |
|---|---|---|---|---|---|---|
| Anolyte Ni (NiSO$_4$ g-Ni/L) | 50 | 50 | 50 | 50 | 50 | 50 |
| Anolyte Na$_2$SO$_4$ g-Na$_2$SO$_4$/L | 100 | 100 | 100 | 227 | 227 | 227 |
| Anolyte H$_2$SO$_4$ | 50 | 50 | 50 | 50 | 50 | 50 |
| MHP (moist) g | 123.7 | 117.5 | 111.3 | 105.2 | 99.0 | 92.8 |
| Stoichiometric MHP Addition % | 100 | 95 | 90 | 85 | 80 | 75 |
| Sodium Persulfate Added g | 7.80 | 6.17 | 5.85 | 5.53 | 5.20 | 4.88 |
| Stoich. Persulfate Addition % | 150 | 125 | 125 | 125 | 125 | 125 |
| Final Slurry Mass g | 824.73 | 818.20 | 819.80 | 825.00 | 823.69 | 822.55 |
| Final Catholyte Mass g | 795.35 | 790.72 | 793.40 | 802.47 | 806.29 | 807.90 |
| Final Catholyte density g/mL | 1.26 | 1.24 | 1.25 | 1.31 | 1.32 | 1.32 |
| Final Catholyte Volume L | 0.63 | 0.64 | 0.63 | 0.61 | 0.61 | 0.61 |
| Final Solids Mass (dry) g | 29.38 | 27.48 | 26.40 | 22.53 | 17.40 | 14.65 |

Figure 5:
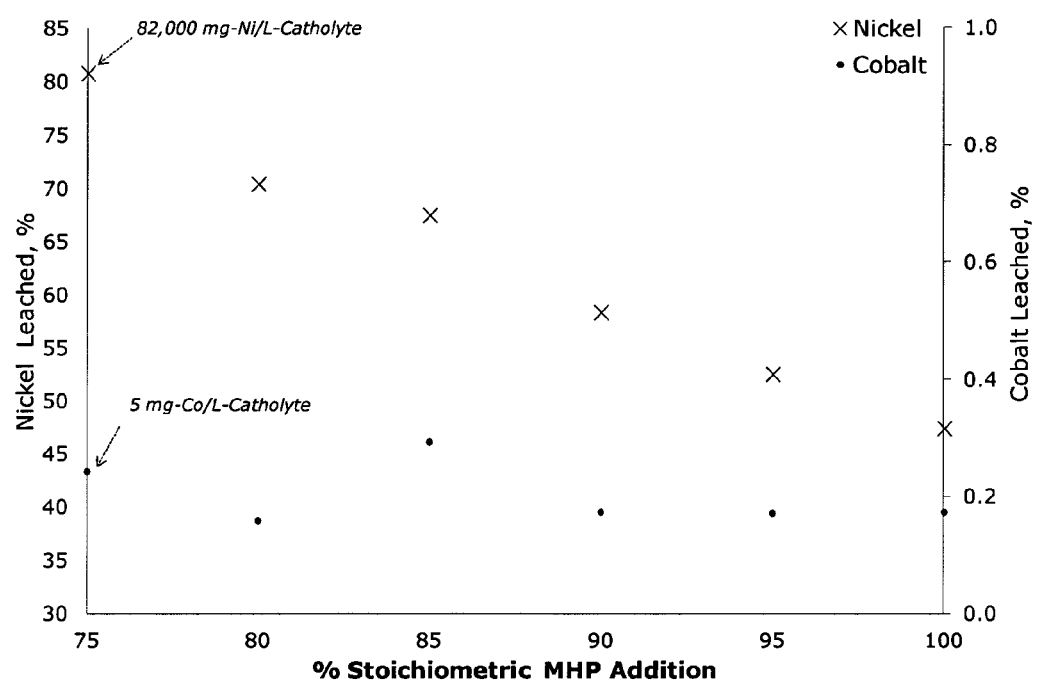
FIG. 5 is a graphical representation of the amounts of nickel and cobalt leached from a mixed nickel-cobalt hydroxide precipitate to solution in tests 6 to 11.

The extent and selectivity of the leaching of nickel from the MHP of table 4 into the simulated nickel anolyte solution is summarized in FIG. 5. For the range of MHP addition investigated (75-100% stoichiometric requirement based on acid use) it can be seen that the cobalt did not dissolve to any great extent and indeed was substantially maintained in the solid state while the fraction of nickel which was leached increased with decreasing MHP addition. This variation in the level of nickel extracted is likely to be due to the pH effect as 100% MHP (in test 6) addition results in a final pH of 5.7 whereas 75% MHP (in test 11) addition results in a lower terminal pH of 4.5. Thus, lowering the stoichiometric MHP addition value results in a better return of nickel leached therefrom. The effects of pH on leaching were already demonstrated in tests 1 to 5 and the results of tests 6 to 11 confirm the importance of optimising the pH for leaching and again indicate that a pH below 5 is preferred.

Once again, the results indicate that the present method is a simple and relatively direct process for the separation of nickel from cobalt in a source material, such as MHP, without the need for solvent extraction steps. The majority of the nickel is recovered to the leach solution in all of tests 6-11 while cobalt leaching is minimal. There is potential for further optimisation, as indicated in tests 1-5, by adjusting the pH or the amount or rate of oxidant addition. The advantages of the present method are further emphasised by the demonstration of leaching of nickel directly from an impure solid source into an anolyte solution creating a catholyte solution suitable for direct electrowinning of nickel metal.

The present process is of simpler design and of lower capital cost compared with prior art approaches due to fewer processing steps, relatively low temperatures during the leaching step and the lack of a requirement for a solvent extraction operation to extract the nickel and cobalt. In one embodiment the temperature during the leaching of nickel is greater than 20° C. but less than 120° C., preferably greater than 50° C. but less than 100° C., more preferably from about 60° C. to about 90° C.

The separation of nickel from cobalt in the MHP is surprisingly effective and provides distinct advantages over certain prior art approaches which instead attempt to selectively precipitate cobalt out of a solution containing both nickel and cobalt. Understanding in the field regarding separation of cobalt from nickel in MHP suggests that the selective leaching of nickel from MHP raises a risk of the solid nickel being passivated (coated) by cobalt(III) solids which could interfere with or prevent the nickel leaching reaction. The present inventors have shown that, surprisingly, this is not in fact the case to any extent which would preclude an efficient separation under the conditions presently identified.

Selectively precipitating cobalt from a nickel and cobalt containing solution tends to be slow and the precipitate may be somewhat difficult to handle even when seeding is employed. Instead, for the present process, the fact that the cobalt is in the solid phase already surprisingly allows for a cobalt concentrate residue that is easy to filter and which avoids the disadvantages of certain of the prior art approaches.

Thus, the present method provides a number of advantages over prior art oxidative approaches including the provision of a sufficiently fast reaction, formation of a cobalt containing solid that is filterable and efficient use of the oxidant, which advantages stem from the approach of directly treating a solid MHP with the acidic leach solution containing an oxidant to selectively dissolve the nickel in preference to the cobalt. A relatively clean cobalt concentrate is also achieved in a single stage i.e. approximately 15 wt % cobalt, which is a further improvement over processes employing the selective precipitation of cobalt from solution.

Figure 6:
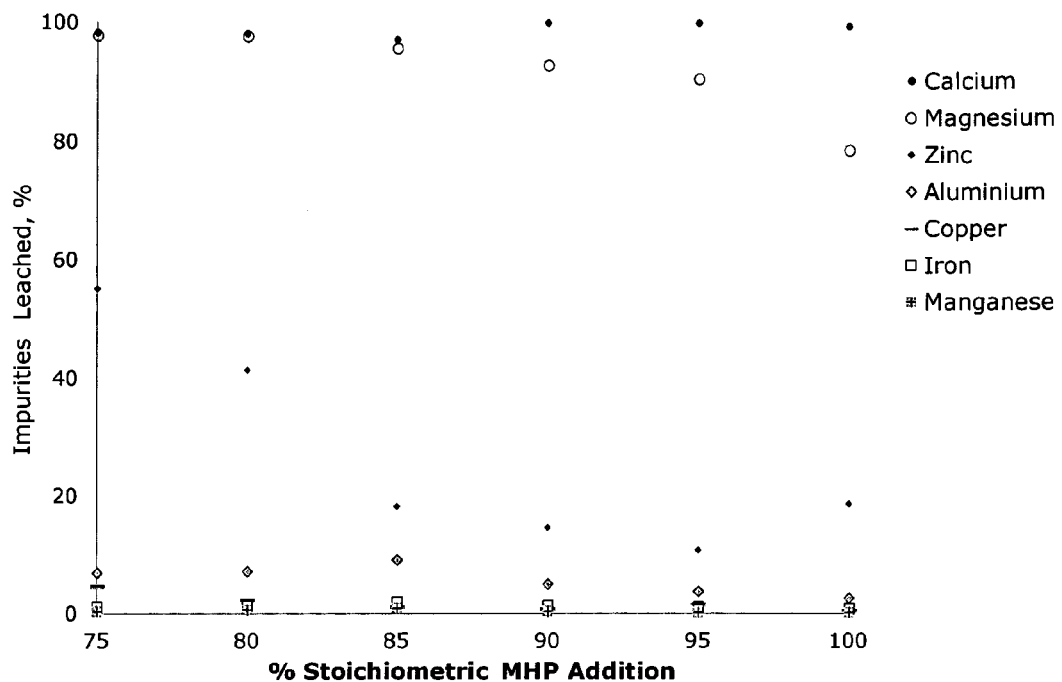
FIG. 6 is a graphical representation of the amounts of various impurities leached from a mixed nickel-cobalt hydroxide precipitate to solution in tests 6 to 11.

The behaviour of the various metallic impurities during MHP leaching is shown in FIG. 6. The amounts of these impurities found within the leaching solution is also indicated in table 6. Calcium and magnesium were largely dissolved during the nickel leaching. Zinc dissolution was dependent on the rate of MHP addition (and hence the resulting pH) so operating at a higher pH prior to electrowinning can be used to prevent zinc dissolution. The extent of aluminium, copper, iron and manganese dissolution is seen to be low and the final solution content of all the impurities is <5 mg/L, except for calcium and magnesium.

TABLE 6

Amounts of nickel and various impurities found in the final
leach solution (nickel catholyte) for tests 6-11

| Test | Al | Ca | Co | Cr | Cu | Fe | Mg | Mn | Na | Ni | Zn |
|---|---|---|---|---|---|---|---|---|---|---|---|
| 6 | 2 | 86 | 4 | 0.0 | 0.2 | 2 | 170 | 1 | 21940 | 71460 | 21 |
| 7 | 2 | 261 | 4 | 0.1 | 0.5 | 2 | 430 | 1 | 21180 | 73239 | 10 |
| 8 | 3 | 309 | 4 | 0.1 | 0.2 | 2 | 506 | 3 | 19978 | 77295 | 13 |
| 9 | 6 | 434 | 6 | 0.2 | 0.3 | 3 | 689 | 6 | 62089 | 77473 | 7 |
| 10 | 4 | 427 | 3 | 0.1 | 0.6 | 2 | 692 | 4 | 63614 | 78051 | 16 |
| 11 | 4 | 369 | 5 | 0.2 | 1.3 | 2 | 611 | 2 | 51739 | 82871 | 19 |

Although the discussion above has generally related to recovery of nickel in the presence of cobalt it should be appreciated that the present method may be equally applicable to various metals which may be separated from cobalt in an ore or like material in a similar manner to that described. Copper and zinc are particularly preferred examples of such metals. Neither copper nor zinc oxidise readily above their divalent state and so they can be dissolved in an acidic leach solution while cobalt and manganese are oxidised and thereby stabilised in the solid phase.

Figure 7:
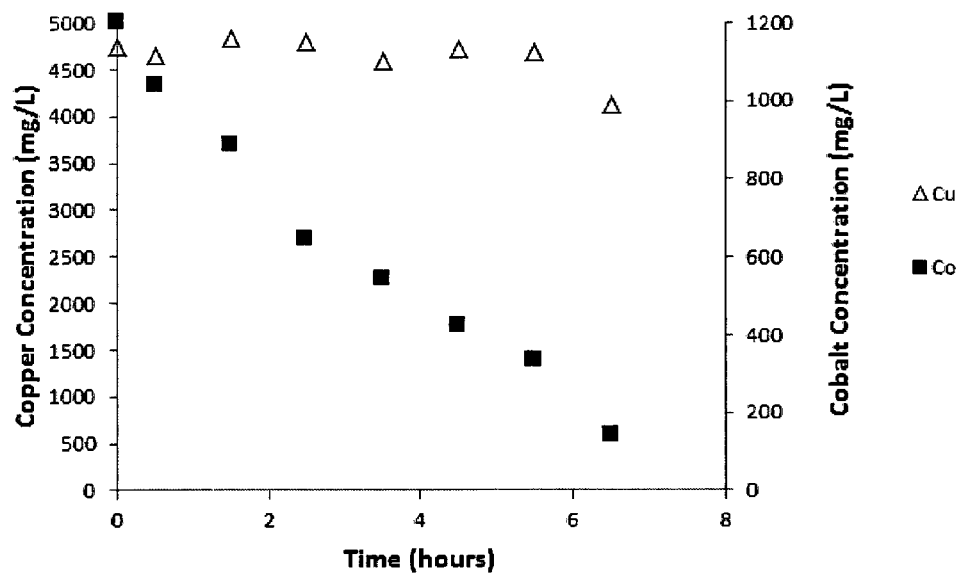
FIG. 7 is a graphical representation of the selective recovery of cobalt in the presence of copper.

FIG. 7 is a graphical representation of the selective oxidative precipitation of cobalt from solution in the presence of copper. Briefly, the test conditions were use of 240% stoichiometric sodium persulphate based on cobalt concentration, 90° C. with an initial pH of 1.4 and terminal pH of 2.7 (pH adjustment with sodium hydroxide). It can be seen that the majority of the copper can be maintained in solution while increasing amounts of cobalt are precipitated into the solid phase with time. At 4 to 6 hours the majority of the copper remained in solution while the majority of the cobalt was selectively precipitated. This result indicates that copper could be separated from cobalt in an ore or ore processing intermediate in a similar manner to that described in detail herein for nickel-cobalt MHP.

Throughout the specification the aim has been to describe preferred embodiments of the invention without limiting the invention to any one embodiment or specific collection of features. It will be appreciated by those of skill in the art that, in light of the present disclosure, various modifications and changes can be made in the particular embodiments exemplified without departing from the scope of the invention.

The invention claimed is:

1. A method of selectively leaching a metal selected from the group consisting of nickel, copper and zinc from a solid ore or solid ore processing intermediate comprising the metal and cobalt, the method including:
   providing a mixture comprising an acidic leach solution and an oxidizing agent; and
   mixing the mixture with the solid ore or solid ore intermediate,
   wherein there is sufficient oxidizing agent to stabilize a substantial portion of the cobalt to cause it to be stabilized in a solid phase while greater than 95% by mass of the metal is selectively dissolved.

2. The method of claim 1 wherein the metal is nickel.

3. The method of claim 1 wherein the solid ore or solid ore processing intermediate is a mixed nickel-cobalt hydroxide precipitate.

4. The method of claim 1 wherein the oxidizing agent has sufficient oxidizing potential to oxidize cobalt(II) to cobalt (III).

5. The method of claim 4 wherein the oxidizing agent has an oxidative potential of greater than about 0.5 V (SHE).

6. The method of claim 4 wherein the oxidizing agent has an oxidative potential of greater than 0.5 V to 3.0 V (SHE).

7. The method of claim 1 wherein the acidic leach solution has a pH from about 1 to about 6.

8. The method of claim 7 wherein the acidic leach solution has a pH from about 2 to about 5.

9. The method of claim 6 wherein the oxidizing agent has an oxidative potential of about 0.5 V to about 3.0 V (SHE) at a pH from 0 to 6.

10. The method of claim 9 wherein the oxidizing agent has an oxidative potential of about 0.5 V to about 1.0 V (SHE) at a pH from 4 to 6.

11. The method of claim 9 wherein the oxidizing agent has an oxidative potential of about 1.0 V to about 2.0 V (SHE) at a pH from 1 to 4.

12. The method of claim 1 wherein the oxidizing agent is selected from the group consisting of persulphates, peroxides, permanganates, perchlorates, ozone, oxides and chlorine.

13. The method of claim 1 further including controlling a rate of addition of the oxidizing agent.

14. The method of claim 1 further including heating the acidic leach solution to greater than 50° C.

15. The method of claim 1 wherein the oxidizing agent is present in the acidic leach solution in 80% to 200% stoichiometric equivalents to combined cobalt and manganese in the solid ore or solid ore processing intermediate.

16. The method of claim 1 wherein the solid ore or solid ore processing intermediate further comprises manganese and treatment with the amount of oxidizing agent causes a substantial portion of the manganese to be stabilized in a solid phase while a substantial portion of the metal is dissolved.

17. The method of claim 1 wherein, after a leaching process is complete, extracted metal can be recovered directly from the acidic leach solution by electrowinning or hydrogen reduction.

18. A method of recovering nickel and cobalt from a mixed nickel-cobalt hydroxide precipitate including:
   (a) providing a mixture comprising an acidic leach solution and an oxidizing agent, wherein there is sufficient oxidizing agent to stabilize a substantial portion of the cobalt to cause it to be stabilized in a solid phase while greater than 95% by mass of the nickel is selectively dissolved;
   (b) mixing the mixture with the mixed nickel-cobalt hydroxide precipitate;
   (c) separating the cobalt in the solid phase from the acidic leach solution containing dissolved nickel to recover the cobalt in the solid phase; and
   (d) recovering the nickel from the acidic leach solution.

19. The method of claim 18 wherein the mixed nickel-cobalt hydroxide precipitate further comprises manganese and addition of an amount of oxidizing agent also causes a substantial portion of the manganese to be stabilized in a solid phase.

20. A method of selectively leaching a metal selected from the group consisting of nickel, copper and zinc from a solid ore or solid ore processing intermediate comprising the metal and cobalt, the method including:

a) providing a mixture comprising an acidic leach solution and an oxidizing agent; and
b) mixing the mixture with the solid ore or solid ore processing intermediate,
wherein there is sufficient oxidizing agent to stabilize a substantial portion of the cobalt to cause it to be stabilized in a solid phase while greater than 95% by mass of the metal is selectively dissolved within 5 hours.

* * * * *